(12) United States Patent
Kito et al.

(10) Patent No.: US 11,014,516 B2
(45) Date of Patent: May 25, 2021

(54) ENERGY ABSORBER

(71) Applicant: TOYOTA BOSHOKU KABUSHIKI KAISHA, Aichi (JP)

(72) Inventors: Masayuki Kito, Aichi (JP); Goro Takahashi, Aichi (JP); Toshihiro Suzuki, Aichi (JP); Yasuyuki Shimizu, Aichi (JP); Yohei Migaki, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 242 days.

(21) Appl. No.: 16/087,344

(22) PCT Filed: Mar. 7, 2017

(86) PCT No.: PCT/JP2017/009095
§ 371 (c)(1),
(2) Date: Sep. 21, 2018

(87) PCT Pub. No.: WO2017/169575
PCT Pub. Date: Oct. 5, 2017

(65) Prior Publication Data
US 2020/0180535 A1 Jun. 11, 2020

(30) Foreign Application Priority Data
Mar. 31, 2016 (JP) .............................. JP2016-071735

(51) Int. Cl.
*B60R 19/18* (2006.01)
*C08L 77/00* (2006.01)
(Continued)

(52) U.S. Cl.
CPC .............. *B60R 19/18* (2013.01); *C08L 77/00* (2013.01); *F16F 7/121* (2013.01); *B60R 21/34* (2013.01);
(Continued)

(58) Field of Classification Search
CPC ..... F16F 7/00; F16F 7/121; F16F 7/12; B60R 19/18; B60R 21/04; B29C 45/00
(Continued)

(56) References Cited

U.S. PATENT DOCUMENTS 6,670,421 B1 12/2003 Lieberman
8,157,066 B2 * 4/2012 Murayama .............. B60R 19/18
188/371
(Continued)

FOREIGN PATENT DOCUMENTS

EP 2796496 10/2014
JP 2009-248816 A 10/2009
(Continued)

OTHER PUBLICATIONS

Notification of Reasons for Refusal issued in Japan Counterpart Patent Appl. No. 2016-071735, dated Nov. 8, 2017, along with an English translation thereof.
(Continued)

*Primary Examiner* — Robert A. Siconolfi
*Assistant Examiner* — San M Aung
(74) *Attorney, Agent, or Firm* — Greenblum & Bernstein, P.L.C.

(57) ABSTRACT

Disclosed herein is an energy absorber having excellent impact resistance and excellent impact energy absorbability. The energy absorber includes an olefin-based resin composition obtained by mixing an olefin resin, a polyamide resin, and an elastomer having a reactive group that reacts with the polyamide resin, wherein the olefin-based resin composition has a continuous phase containing the olefin resin and a polyamide resin-based dispersed phase dispersed in the continuous phase, and the polyamide resin-based dispersed phase has a structure in which the elastomer is contained in a matrix phase containing the polyamide resin.

8 Claims, 4 Drawing Sheets

(51) Int. Cl.
*F16F 7/12* (2006.01)
*B60R 21/34* (2011.01)
(52) U.S. Cl.
CPC . *B60R 2019/184* (2013.01); *B60R 2019/1866* (2013.01)
(58) Field of Classification Search
USPC .......................................................... 188/371
See application file for complete search history.

(56) References Cited

U.S. PATENT DOCUMENTS

| | | | |
|---|---|---|---|
| 8,876,179 B2* | 11/2014 | Nagwanshi | B60R 19/18 293/120 |
| 9,586,355 B2 | 3/2017 | Cheng et al. | |
| 2005/0107533 A1 | 5/2005 | Schauder | |
| 2006/0148987 A1 | 7/2006 | Schauder | |
| 2009/0250966 A1 | 10/2009 | Suzuki et al. | |
| 2012/0112479 A1* | 5/2012 | Nagwanshi | F16F 7/121 293/133 |
| 2012/0232210 A1 | 9/2012 | Cheng et al. | |
| 2013/0175128 A1* | 7/2013 | Kumar | B60R 19/18 188/377 |
| 2014/0364569 A1* | 12/2014 | Kito | C08L 23/02 525/183 |
| 2014/0371394 A1 | 12/2014 | Kito et al. | |
| 2015/0065625 A1 | 3/2015 | Nadella et al. | |
| 2015/0218373 A1 | 8/2015 | Kawada et al. | |
| 2016/0108194 A1 | 4/2016 | Topolkaraev et al. | |
| 2017/0029610 A1 | 2/2017 | Kito et al. | |

FOREIGN PATENT DOCUMENTS

| | | |
|---|---|---|
| JP | 2012-76570 A | 4/2012 |
| JP | 2012-222846 A | 11/2012 |
| JP | 2013-147646 A | 8/2013 |
| JP | 2013-147647 A | 8/2013 |
| JP | 2013-147648 A | 8/2013 |
| JP | 2013-237242 | 11/2013 |
| JP | 2014-025060 A | 2/2014 |
| JP | 2016-027178 A | 2/2016 |
| RU | 2571737 C2 | 1/2015 |
| WO | 2005/035648 | 4/2005 |
| WO | 2012125195 A1 | 9/2012 |
| WO | 2014199277 A1 | 12/2014 |

OTHER PUBLICATIONS

International Search Report issued with respect to Patent Application No. PCT/JP2017/009095, dated Apr. 4, 2017.
International Preliminary Report on Patentability issued with respect to Patent Application No. PCT/JP2017/009095, dated Oct. 2, 2018.
U.S. Appl. No. 15/776,868 to Kito et al., filed Nov. 29, 2016.
U.S. Appl. No. 15/776,867 to Kito et al., filed Nov. 29, 2016.
U.S. Appl. No. 16/073,589 to Kito et al., filed Mar. 10, 2017.
U.S. Appl. No. 16/086,696 to Kito et al., filed Mar. 15, 2017.
U.S. Appl. No. 16/087,323 to Kito et al., filed Mar. 15, 2017.
India Office Action, India Patent Office, Application No. 201817028810, dated Dec. 30, 2019.
European Search Report, European patent Office, Application No. 17774120.4, dated Oct. 8, 2019.
Korean Office Action, Korean Patent Office, Application No. 10-2018-7030603, dated Sep. 3, 2019, with English machine translation.
Russian Office Action of the corresponding Russian Application No. 2018136244/04, dated Feb. 26, 2019, along with the English translation.
Russian Search Report, of the corresponding Russian Application No. 2018136244/04, dated Feb. 26, 2019, along with the English translation.
Chinese Office Action, Chinese Patent Office, Application No. 201780019667.8, dated May 8, 2020, English translation.
Russian Office Action, Russian Patent Office, Application No. 2018136244, dated May 18, 2020, English translation.

* cited by examiner

ENERGY ABSORBER

TECHNICAL FIELD

The present invention relates to an energy absorber having excellent impact resistance and excellent impact energy absorbability.

BACKGROUND ART

In order to absorb collision energy at the time of collision, vehicles such as automobiles are conventionally provided with members called EA (Energy Absorption) materials. For example, EA materials provided in door trims of automobiles are known which are intended to absorb collision energy at the time of broadside collision. More specifically, hollow EA materials produced by blow molding or EA materials having ribs and produced by injection molding are disclosed (see Patent Literature 1 and Patent Literature 2).

CITATIONS LIST

Patent Literatures

Patent Literature 1: JP 2012-222846 A
Patent Literature 2: JP 2009-248816 A

SUMMARY OF INVENTION

Technical Problems

However, there is a fear that when subjected to an impact beyond allowable limits, conventional EA materials are broken, for example, fractured. Under the circumstances, there has been demand for an EA material that has further improved impact energy absorbability and that is much less likely to be broken, for example, fractured.

In light of the above circumstance, it is an object of the present invention to provide an energy absorber having excellent impact resistance and excellent impact energy absorbability.

Solutions to Problems

In order to achieve the above object, the present invention provides the following.

In one embodiment, an energy absorber includes an olefin-based resin composition obtained by mixing an olefin resin, a polyamide resin, and an elastomer having a reactive group that reacts with the polyamide resin, wherein
the olefin-based resin composition has a continuous phase containing the olefin resin, and a polyamide resin-based dispersed phase dispersed in the continuous phase, and
the polyamide resin-based dispersed phase has a structure in which the elastomer is contained in a matrix phase containing the polyamide resin.

In one embodiment of the energy absorber, when a total of the continuous phase and the polyamide resin-based dispersed phase is taken as 100% by mass, a ratio of the polyamide resin-based dispersed phase is 90% by mass or less.

In one embodiment of the energy absorber, the olefin resin is a polymer containing a structural unit derived from propylene.

In one embodiment of the energy absorber, the elastomer is an α-olefin-based copolymer containing a structural unit derived from an α-olefin having 3 to 8 carbon atoms.

In one embodiment of the energy absorber, the reactive group is an acid anhydride group or a carboxyl group.

In one embodiment of the energy absorber, the energy absorber has an impact absorbing frame having an impact absorbing wall whose plane direction is along a direction in which an impact load is to be applied, wherein
the impact absorbing wall is collapsed to absorb an impact when subjected to the impact load.

In one embodiment of the energy absorber, the impact absorbing frame has a tubular hollow portion surrounded by the impact absorbing wall.

In one embodiment of the energy absorber, the impact absorbing frame has a honeycomb structure having the two or more tubular hollow portions.

In one embodiment, the energy absorber is for vehicles.

Advantageous Effects of Invention

The energy absorber according to the present invention includes a specific olefin-based resin composition, and therefore has excellent impact resistance and excellent impact energy absorbability and is less likely to be broken, for example, fractured. Further, the energy absorber according to the present invention exhibits excellent ductility (extensibility) and repairability (restorability) when subjected to an impact, and therefore unless the energy absorber according to the present invention is broken, its shape is restored. That is, the energy absorber according to the present invention has also excellent durability. Further, even when subjected to an excessive impact, the energy absorber according to the present invention is ductilely fractured, and therefore a negative influence on its surroundings can be reduced. Further, the energy absorber according to the present invention includes an olefin-based resin composition that has excellent flowability when melted, and therefore has excellent formability. Therefore, the energy absorber can have a fine shape by injection molding or the like.

Further, the energy absorber according to the present invention may have an impact absorbing frame having an impact absorbing wall whose plane direction is along a direction in which an impact load is to be applied. In this case, the energy absorber according to the present invention configured to allow the impact absorbing wall to collapse to absorb an impact when subjected to an impact load can have further improved impact energy absorbability, and is therefore much less likely to be broken, for example, fractured.

Further, the impact absorbing frame may have a tubular hollow portion surrounded by the impact absorbing wall. In this case, the energy absorber according to the present invention can have further improved impact energy absorbability, and is therefore much less likely to be broken, for example, fractured.

Further, the impact absorbing frame may have a honeycomb structure having the two or more tubular hollow portions. In this case, the energy absorber according to the present invention can have further improved impact energy absorbability, and is therefore much less likely to be broken, for example, fractured.

BRIEF DESCRIPTION OF DRAWINGS

The present invention will be further described in the following detailed description with reference to non-limiting examples of exemplary embodiments of the present invention and noted drawings in which the same reference signs in some of the drawings denote the same components.

DESCRIPTION OF EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

An energy absorber according to the present invention includes an olefin-based resin composition having a specific structure and obtained by mixing an olefin resin (hereinafter referred to as "component (A)"), a polyamide resin (hereinafter referred to as "component (B)"), and an elastomer having a reactive group that reacts with the polyamide resin (hereinafter referred to as "modified elastomer (C)" or "component (C)"), that is, an olefin-based resin composition having a continuous phase containing the component (A) and a polyamide resin-based dispersed phase dispersed in the continuous phase and having a structure in which the component (C) is contained in a matrix phase containing the component (B).

The olefin-based resin composition is preferably a thermoplastic resin composition. The continuous phase constituting this composition is a phase containing the component (A), and may be a phase composed of the component (A) and another resin (which will be described later) depending on the purpose, intended use, etc. The structure of the continuous phase is not particularly limited, and may be either a crosslinked structure or a non-crosslinked structure.

The component (A) to be used is not particularly limited, and may be a conventionally-known polyolefin. Examples of the component (A) include an ethylene homopolymer, a copolymer of ethylene and an unsaturated hydrocarbon having 3 or more carbon atoms (hereinafter referred to as "α-olefin"), an α-olefin homopolymer, and a copolymer of two or more α-olefins. These polymers may be used singly or in combination of two or more of them.

Examples of the α-olefin include propylene, 1-butene, 1-pentene, 1-hexene, 1-heptene, 3-methyl-1-butene, and 4-methyl-1-pentene.

The component (A) is preferably an α-olefin homopolymer or copolymer, more preferably polypropylene, an ethylene-propylene copolymer, an ethylene-1-butene copolymer, an ethylene-propylene-1-butene copolymer, or the like, particularly preferably a polymer containing a structural unit derived from propylene.

The weight-average molecular weight (based on polystyrene standards) of the component (A) measured by gel permeation chromatography (GPC) is not particularly limited, but is, for example, preferably 10,000 to 500,000, more preferably 100,000 to 450,000, even more preferably 200,000 to 400,000 from the viewpoint of achieving excellent impact resistance and impact energy absorbability.

It is to be noted that the component (A) is different from a polyolefin-based component as the component (C), which will be described later, in that the component (A) is an olefin resin that has no affinity for the component (B) and that has no reactive group that can react with the component (B), either.

As described above, the continuous phase may be composed of only the component (A), or may further contain another resin as long as the other resin forms a continuous phase together with the component (A). That is, a co-continuous phase may be formed. In the latter case, an example of the other resin is a polyamide resin (component (B)).

Further, the continuous phase contains a polyamide resin-based dispersed phase, and may contain an additive that will be described later in a dispersed state.

The polyamide resin-based dispersed phase constituting the olefin-based resin composition is a phase in which the modified elastomer is contained in a matrix phase containing the component (B).

The matrix phase may be a phase composed of only the component (B) or may be a phase composed of the component (B) and another resin (which will be described later) depending on the purpose, intended use, etc.

The component (B) is not particularly limited as long as its main chain has an amide bond (—NH—CO—). Examples of the component (B) include resins obtained by conventionally-known methods such as ring-opening polymerization of a lactam, dehydration condensation of an amino acid, polycondensation of a diamine and a dicarboxylic acid, and polycondensation of aminocarboxylic acids, and these resins may be used singly or in combination of two or more of them Hereinbelow, examples of a raw material compound to be used for production of the component (B) will be described. The component (B) may be one obtained using the raw material compound singly or one obtained using the two or more raw material compounds.

Examples of the lactam include ε-caprolactam, undecane lactam, and ω-lauryl lactam.

Examples of the amino acid include aminocaproic acid, aminoundecanoic acid, aminododecanoic acid, and paraaminomethylbenzoic acid.

Examples of the diamine include: aliphatic diamines such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexanediamine and bis-(4-aminocyclohexyl)methane; and aromatic diamines such as m-phenylenediamine, p-phenylenediamine, m-xylylenediamine, and p-xylylenediamine.

Examples of the dicarboxylic acid include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; alicyclic dicarboxylic acids such as cyclohexanedicarboxylic acids; and aromatic dicarboxylic acids such as orthophthalic acid, terephthalic acid, isophthalic acid, and naphthalene dicarboxylic acid.

Specific examples of the component (B) include polyamide 6, polyamide 66, polyamide 610, polyamide 612, polyamide 614, polyamide 11, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T. Among them, polyamide 11 is particularly preferred. The polyamide 11 is preferably used either singly or in combination with another polyamide resin. It is to be noted that in the latter case, the upper limit of content of the other polyamide resin is preferably 40% by mass with respect to the total mass of the component (B).

The polyamide 11 is preferably a resin obtained using 11-aminoundecanoic acid or undecane lactam as a monomer. 11-aminoundecanoic acid can be obtained from castor oil, and therefore polyamide 11 obtained using such 11-aminoundecanoic acid is preferred from the viewpoint of environmental protection (particularly from the viewpoint of carbon neutral).

The weight-average molecular weight (based on polystyrene standards) of the component (B) measured by gel permeation chromatography (GPC) is not particularly limited, but is, for example, preferably 5,000 to 100,000, more preferably 7,500 to 50,000, even more preferably 10,000 to 50,000 from the viewpoint of achieving excellent impact resistance and impact energy absorbability.

As described above, the matrix phase may further contain another resin. The other resin is preferably a resin having compatibility with the component (B).

Further, the polyamide resin-based dispersed phase is preferably contained in at least the component (A) constituting the continuous phase.

The component (C) is an elastomer having a reactive group that reacts with the polyamide resin. That is, the component (C) is an elastomer having a reactive group that can react with the polyamide resin.

This component (C) is preferably a component having an affinity for the olefin resin. More specifically, the component (C) preferably has compatibilizing effect on the polyamide resin and the olefin resin. In other words, the component (C) is preferably a compatibilizer for the polyamide resin and polyolefin resin.

The component (C) used in the present invention is particularly preferably an elastomer having a reactive group that reacts with the polyamide resin in the side chain or at the end of the molecule. The amount of modification is not particularly limited. For example, the number of reactive groups contained in one molecule of the modified elastomer is preferably 1 or more, more preferably 2 to 50, even more preferably 3 to 30, particularly preferably 5 to 20.

As the component (C), such modified elastomers may be used singly or in combination of two or more of them.

Examples of an elastomer before modification include an olefin-based elastomer and a styrene-based elastomer. The elastomer before modification is particularly preferably an olefin-based elastomer.

The olefin-based elastomer is preferably an α-olefin-based copolymer containing a structural unit derived from an α-olefin having 3 to 8 carbon atoms, and examples of such an α-olefin-based copolymer include an ethylene-α-olefin copolymer, an α-olefin copolymer, an α-olefin-non-conjugated diene copolymer, and an ethylene-α-olefin-non-conjugated diene copolymer. Among them, an ethylene-α-olefin copolymer, an α-olefin copolymer, and an ethylene-α-olefin-non-conjugated diene copolymer are particularly preferred.

Examples of the non-conjugated diene include: linear non-cyclic diene compounds such as 1,4-pentadiene, 1,4-hexadiene, 1,5-hexadiene and 1,6-hexadiene; branched non-cyclic diene compounds such as 5-methyl-1,4-hexadiene, 3,7-dimethyl-1,6-octadiene, 5,7-dimethylocta-1,6-diene, 3,7-dimethyl-1,7-octadiene, 7-methylocta-1,6-diene, and dihydromyrcene; and alicyclic diene compounds such as tetrahydroindene, methyltetrahydroindene, dicyclopentadiene, bicyclo[2.2.1]-hepta-2,5-diene, 5-methylene-2-norbornene, 5-ethylidene-2-norbornene, 5-propenyl-2-norbornene, 5-isopropylidene-2-norbornene, 5-cyclohexylidene-2-norbornene, and 5-vinyl-2-norbornene.

Specific examples of the olefin elastomer include an ethylene-propylene copolymer, an ethylene-1-butene copolymer, an ethylene-1-pentene copolymer, an ethylene-1-hexene copolymer, an ethylene-1-octene copolymer, a propylene-1-butene copolymer, a propylene-1-pentene copolymer, a propylene-1-hexene copolymer, and a propylene-1-octene copolymer. Among them, an ethylene-propylene copolymer, an ethylene-1-butene copolymer, and an ethylene-1-octene copolymer are preferred.

Examples of the styrene-based elastomer include a block copolymer of an aromatic vinyl compound and a conjugated diene compound and a hydrogenated product thereof.

Examples of the aromatic vinyl compound include: styrene; alkylstyrenes such as α-methylstyrene, p-methylstyrene, and p-tert-butylstyrene; p-methoxystyrene; and vinylnaphthalene.

Examples of the conjugated diene compound include butadiene, isoprene, 1,3-pentadiene, methylpentadiene, phenylbutadiene, 3,4-dimethyl-1,3-hexadiene, and 4,5-diethyl-1,3-octadiene.

Specific examples of the styrene-based elastomer include styrene-butadiene-styrene copolymers (SBSs), styrene-isoprene-styrene copolymers (SISs), styrene-ethylene/butylene-styrene copolymers (SEBSs), and styrene-ethylene/propylene-styrene copolymers (SEPSs).

The weight-average molecular weight (based on polystyrene standards) of the elastomer measured by gel permeation chromatography (GPC) is not particularly limited, but is, for example, preferably 10,000 to 500,000, more preferably 20,000 to 500,000, even more preferably 30,000 to 300,000 from the viewpoint of achieving excellent impact resistance and impact energy absorbability.

Examples of the reactive group that reacts with the polyamide resin include an acid anhydride group, a carboxyl group, an epoxy group, an oxazoline group, and an isocyanate group. It is to be noted that a method for attaching such a reactive group to the elastomer is not particularly limited, and a known method may be used.

Among the above-mentioned reactive groups, an acid anhydride group and a carboxyl group are preferred, and an acid anhydride group is particularly preferred.

Examples of a monomer (acid anhydride) for introducing an acid anhydride group include acid anhydrides such as maleic anhydride, phthalic anhydride, itaconic anhydride, succinic anhydride, glutaric anhydride, adipic anhydride, citraconic anhydride, tetrahydrophthalic anhydride, and butenyl succinic anhydride. Among them, maleic anhydride, phthalic anhydride, and itaconic anhydride are preferred, and maleic anhydride is particularly preferred.

Examples of a monomer (carboxylic acid) for introducing a carboxyl group include acrylic acid, methacrylic acid, maleic acid, fumaric acid, itaconic acid, and citraconic acid.

It is to be noted that these monomers may be used singly or in combination of two or more of them.

Specific examples of the component (C) include an acid-modified elastomer having an acid anhydride group attached thereto, a carboxylic acid-modified elastomer having a carboxyl group attached thereto, an epoxy-modified elastomer having an epoxy group attached thereto, an oxazoline-modified elastomer having an oxazoline group attached thereto, and an isocyanate-modified elastomer having an isocyanate group attached thereto.

Among them, an elastomer modified with an acid anhydride or an elastomer modified with a carboxylic acid is preferred, and an elastomer modified with maleic anhydride is particularly preferred. More specifically, the component (C) is preferably an elastomer modified with maleic anhydride such as a maleic anhydride-modified ethylene-propylene copolymer, a maleic anhydride-modified ethylene-1-butene copolymer, a maleic anhydride-modified ethylene-1-hexene copolymer, or a maleic anhydride-modified ethylene-1-octene copolymer.

The polyamide-based resin dispersed phase may contain only the component (C) or may further contain another elastomer in its matrix phase containing the component (B). As the other elastomer, a non-modified olefin elastomer or the like can be used.

The shape and size of the component (C) contained in the matrix phase of the polyimide-based resin dispersed phase and the shape and size of the other elastomer that may be contained in the matrix phase of the polyamide-based resin dispersed phase are not particularly limited.

The average of the diameters of particles of the phase (fine dispersed phase) containing the modified elastomer (C) is not particularly limited, but is, for example, preferably 5 to 1000 nm, more preferably 8 to 600 nm, even more preferably 10 to 400 nm, particularly preferably 15 to 350 nm from the viewpoint of achieving excellent impact resistance and impact energy absorbability. It is to be noted that the average is determined in the following manner. One hundred particles of a phase (which is composed of the component (C) and a reaction product of the component (C) and the polyamide resin) in the polyamide-based resin dispersed phase are randomly selected in an image obtained using an electron microscope, the diameter of each of the particles is measured, and the average of the measured diameters is determined.

The polyamide-based resin dispersed phase may have a definite shape, such as a spherical shape or an oval spherical shape, or a variation thereof (indefinite shape), and may have surface irregularities.

The upper limit of maximum diameter of the polyamide-based resin dispersed phase is not particularly limited, but is preferably 20,000 nm, more preferably 10,000 nm, even more preferably 8000 nm, particularly preferably 4000 nm from the viewpoint of achieving excellent impact resistance and excellent impact energy absorbability. However, the lower limit is usually 5 nm (particularly 10 nm, more particularly 15 nm, even more particularly 50 nm). The maximum diameter may be measured using an image obtained by an electron microscope.

The olefin-based resin composition contains a plurality of particles of the polyamide-based resin dispersed phase, and the particles may be particles having almost the same shape and size, a combination of two or more kinds of particles having almost the same maximum diameter, or particles having various sizes within the above range.

The olefin-based resin composition includes a continuous phase containing the component (A) and a polyamide resin-based dispersed phase dispersed in the continuous phase, and the polyamide resin-based dispersed phase may be directly contained in the continuous phase, or may be contained in a state where an interfacial phase is provided in at least part of the interface between the continuous phase and the polyamide resin-based dispersed phase.

The interfacial phase may contain the modified elastomer or a reaction product of the modified elastomer and a resin component such as the component (B).

It is to be noted that the thickness of the interfacial phase is not particularly limited.

Examples of an additive that can be contained in the continuous phase or the polyamide resin-based dispersed phase include a nucleating agent, an antioxidant, a thermal stabilizer, a weathering agent, a light stabilizer, a plasticizer, an ultraviolet absorber, an antistatic agent, a flame retardant, a slip agent, an anti-blocking agent, an anti-fogging agent, a lubricant, a pigment, a dye, a dispersant, a copper inhibitor, a neutralizer, an anti-foaming agent, a weld strength improver, a natural oil, a synthetic oil, and a wax. It is to be noted that these additives may be used singly or in combination of two or more of them.

Examples of the nucleating agent and the reinforcing filler include: silicates such as talc, silica, clay, montmorillonite, and kaolin; carbonates such as calcium carbonate, lithium carbonate, and magnesium carbonate; metal oxides such as alumina, titanium oxide, and zinc oxide; metals such as aluminum, iron, silver, and copper; hydroxides such as aluminum hydroxide and magnesium hydroxide; sulfides such as barium sulfate; carbides such as charcoal and bamboo charcoal; titanides such as potassium titanate and barium titanate; celluloses such as cellulose microfibrils and cellulose acetate; resin fibers such as polyethylene terephthalate fibers, nylon fibers, polyethylene naphthalate fibers, aramid fibers, vinylon fibers, and polyarylate fibers; and carbons such as fullerenes and carbon nanotubes.

Examples of the antioxidant include phenol-based compounds, organic phosphite-based compounds, and thioether-based compounds.

Examples of the heat stabilizer include hindered amine-based compounds.

Examples of the ultraviolet absorber include benzophenone-based compounds, benzotriazole-based compounds, and benzoate-based compounds.

Examples of the antistatic agent include nonionic compounds, cationic compounds, and anionic compounds.

Examples of the flame retardant include halogen-based compounds, phosphorus-based compounds (e.g., nitrogen-containing phosphate compounds and phosphate esters), nitrogen-based compounds (e.g., guanidine, triazine, melamine, and derivatives thereof), inorganic compounds (e.g., metal hydroxides), boron-based compounds, silicone-based compounds, sulfur-based compounds, and red phosphorus-based compounds.

Examples of the flame retardant aid include various antimony compounds, zinc compounds, bismuth compounds, magnesium hydroxide, and clayey silicate.

When the total of the continuous phase and the polyimide resin-based dispersed phase of the olefin-based resin composition constituting the energy absorber according to the present invention is taken as 100% by mass, the ratio of the polyamide resin-based dispersed phase may be 90% by mass or less (particularly, 2 to 90% by mass). The content of the polyamide resin-based dispersed phase is preferably 5 to 85% by mass, more preferably 10 to 83% by mass, even more preferably 15 to 80% by mass, even more preferably 20 to 78% by mass, particularly preferably 25 to 75% by mass, more particularly preferably 30 to 73% by mass, even more particularly preferably 35 to 70% by mass. That is, the ratio of the continuous phase may be 10% by mass or more (particularly, 10 to 98% by mass), but is preferably 15 to 95% by mass, more preferably 17 to 90% by mass, even more preferably 20 to 85% by mass, even more preferably 22 to 80% by mass, particularly preferably 25 to 75% by mass, more particularly preferably 27 to 70% by mass, even more particularly preferably 30 to 65% by mass.

When the content of the polyamide resin-based dispersed phase is within the above range, it is possible to obtain an energy absorber having excellent impact resistance and excellent impact energy absorbability. Particularly, it is possible to obtain an energy absorber having an excellent performance balance among impact resistance, impact energy absorbability, and moldability.

When the total of the component (B) and the component (C) contained in the polyamide-based resin dispersed phase of the olefin-based resin composition constituting the energy absorber according to the present invention is taken as 100% by mass, the content of the component (C) contained in the polyamide-based resin dispersed phase may be 20 to 90% by mass. The content of the component (C) is preferably 22 to 88% by mass, more preferably 25 to 86% by mass, even more preferably 27 to 75% by mass, even more preferably 29 to 70% by mass, particularly preferably 32 to 66% by mass, more particularly preferably 36 to 60% by mass. That is, the content of the component (B) contained in the polyamide-based resin dispersed phase may be 10 to 80% by mass, preferably 12 to 78% by mass, more preferably 14 to 75% by mass, even more preferably 25 to 73% by mass, even more preferably 30 to 71% by mass, particularly preferably 34 to 68% by mass, more particularly preferably 40 to 64% by mass.

When the content of the component (C) is within the above range, the polyamide-based resin dispersed phase composed of the components (B) and (C) and dispersed in the continuous phase can be made smaller. Further, the amount of the component (B) having a large specific gravity to be used can be reduced to reduce the specific gravity of the energy absorber made of the olefin-based resin composition. This makes it possible to obtain an energy absorber having excellent impact resistance and excellent impact energy absorbability while being lightweight. Further, since the content of the component (B) can be reduced while such mechanical characteristics are sufficiently maintained, the energy absorber made of the olefin-based resin composition can have a low-gloss appearance with low surface luster. Therefore, the energy absorber can be applied to exterior and interior materials that are directly visually recognized, and can offer excellent design flexibility.

When the total of the component (A) and the component (B) of the olefin-based resin composition constituting the energy absorber according to the present invention is taken as 100% by mass, the content of the component (B) may be 1.5 to 88% by mass. The content of the component (B) is preferably 3 to 75% by mass, more preferably 5 to 70% by mass, even more preferably 10 to 65% by mass, even more preferably 15 to 60% by mass, particularly preferably 18 to 55% by mass, more particularly preferably 20 to 50% by mass, even more particularly preferably 25 to 45% by mass. That is, the content of the component (A) may be 12 to 98.5% by mass, but is preferably 25 to 97% by mass, more preferably 30 to 95% by mass, even more preferably 35 to 90% by mass, even more preferably 40 to 85% by mass, particularly preferably 45 to 82% by mass, more particularly preferably 50 to 80% by mass, even more particularly preferably 55 to 75% by mass.

When the content of the component (B) is within the above range, it is possible to obtain an energy absorber having excellent impact resistance and excellent impact energy absorbability. Particularly, it is possible to obtain an energy absorber having an excellent performance balance among impact resistance, impact energy absorbability, and moldability.

When the total of the component (A), the component (B), and the component (C) of the olefin-based resin composition constituting the energy absorber according to the present invention is taken as 100% by mass, the content of the component (A) may be 2 to 90% by mass. The content of the polyamide resin-based dispersed phase is preferably 5 to 85% by mass, more preferably 10 to 83% by mass, even more preferably 15 to 80% by mass, even more preferably 20 to 78% by mass, particularly preferably 25 to 75% by mass, more particularly preferably 30 to 73% by mass, even more particularly preferably 35 to 70% by mass. When the content of the component (A) is in the above range, excellent impact resistance and excellent impact energy absorbability are achieved. Particularly, it is possible to obtain an energy absorber having an excellent performance balance among impact resistance, impact energy absorbability, and moldability.

When the total of the component (A), the component (B), and the component (C) of the olefin-based resin composition constituting the energy absorber according to the present invention is taken as 100% by mass, the content of the component (B) may be 1 to 75% by mass. The content of the component (B) is preferably 3 to 70% by mass, more preferably 5 to 65% by mass, even more preferably 7 to 60% by mass, even more preferably 10 to 57% by mass, particularly preferably 13 to 55% by mass, more particularly preferably 15 to 50% by mass, even more particularly preferably 20 to 45% by mass. When the content of the component (B) is in the above range, excellent impact resistance and excellent impact energy absorbability are achieved. Particularly, it is possible to obtain an energy absorber having an excellent performance balance among impact resistance, impact energy absorbability, and moldability.

When the total of the component (A), the component (B), and the component (C) of the olefin-based resin composition constituting the energy absorber according to the present invention is taken as 100% by mass, the content of the component (C) may be 1 to 60% by mass. The content of the component (C) is preferably 3 to 55% by mass, more preferably 5 to 50% by mass, even more preferably 7 to 45% by mass, even more preferably 10 to 43% by mass, particularly preferably 10 to 40% by mass, more particularly preferably 13 to 37% by mass, even more particularly preferably 15 to 35% by mass. When the content of the component (C) is in the above range, excellent impact resistance and excellent impact energy absorbability are achieved. Particularly, it is possible to obtain an energy absorber having an excellent performance balance among impact resistance, impact energy absorbability, and moldability.

It is to be noted that the energy absorber according to the present invention may be constituted from only the olefin-based resin composition or a mixture of the olefin-based resin composition and another constituent material.

Examples of the other constituent material include another olefin resin, another thermoplastic resin (except for the resins contained in the olefin-based resin composition and the other olefin resin), a reinforcing filler, a flame retardant, a flame retardant aid, a filler, a colorant, an antibacterial agent, and an antistatic agent. It is to be noted that these other constituent materials may be used singly or in combination of two or more of them.

As the other olefin resin, a known polyolefin can be used. Specific examples thereof include an ethylene homopolymer, a copolymer of ethylene and an $\alpha$-olefin (e.g., propylene, 1-butene, 1-pentene, 1-hexene, 1-heptene, 3-methyl-1-butene, or 4-methyl-1-pentene), an $\alpha$-olefin homopolymer, and a copolymer of two or more $\alpha$-olefins. It is to be noted that these other olefin resins may be used singly or in combination of two or more of them.

A specific example of the other olefin resin is polypropylene.

The weight-average molecular weight (based on polystyrene standards) of the other olefin resin measured by gel permeation chromatography (GPC) is not particularly limited, but is, for example, preferably 10,000 to 500,000, more preferably 100,000 to 450,000, even more preferably 200,000 to 400,000.

When the energy absorber according to the present invention contains the other olefin resin, the content of the olefin-based resin composition may be 1 to 99% by mass per 100% by mass of the total of the olefin-based resin composition and the other olefin resin. The content of the olefin-based resin composition may be particularly 1 to 99% by mass, more particularly 5 to 95% by mass, even more particularly 10 to 90% by mass, even more particularly 15 to 85% by mass, even more particularly 20 to 80% by mass, even more particularly 30 to 70% by mass, even more particularly 40 to 60% by mass.

In this case (i.e., in a case where the total of the olefin-based resin composition and the other olefin resin is taken as 100% by mass), the content of each of the components (A) to (C) is determined by multiplying the above-described content of each of the components (A) to (C) by the content (%) of the olefin-based resin composition.

Examples of the other thermoplastic resin include polyester-based resins (polybutylene terephthalate, polyethylene terephthalate, polycarbonate, polybutylene succinate, polyethylene succinate, and polylactic acid).

Examples of the reinforcing filler include glass fibers, carbon fibers, and organic fibers (e.g., resin fibers such as polyethylene terephthalate fibers, nylon fibers, and aramid fibers (e.g., Kevlar)).

Further, the bar-flow length of the resin composition (the olefin-based resin composition or a mixture of the olefin resin composition and another constituent material) constituting the energy absorber according to the present invention as measured by the following method may be 300 mm or more (particularly, 350 to 750 mm, more particularly 390 to 700 mm, even more particularly 400 to 650 mm). When this value is within the above range, the resin composition constituting the energy absorber according to the present invention has more excellent formability (moldability), and therefore an energy absorber having a finer shape can be obtained by injection molding or the like.

It is to be noted that the bar-flow length is the length of a molded body obtained by injection molding performed using an injection molding machine having a bar-flow mold (i.e., a mold having an angular spiral cavity having an injection port diameter of 10 mm, a width of 20 mm, and a thickness of 2 mm) connected thereto under conditions of a cylinder temperature of 190° C., a mold temperature of 60° C. an injection pressure of 150 MPa, an injection rate of 25 to 200 mm/sec, and a metering value of 60 (a screw is retracted by 60 mm to provide, in a cylinder, a space of 60 mm for storing a material to be injected).

Further, the resin composition (the olefin-based resin composition or a mixture of the olefin resin composition and another constituent material) constituting the energy absorber according to the present invention may have a stress at break of 10 MPa or more (particularly 12 to 50 MPa, more particularly 15 to 45 MPa, even more particularly 18 to 40 MPa) as measured by the following tensile test and an elongation at break of 70% or more (particularly 80 to 500%, more particularly 100 to 400%, even more particularly 150 to 350%). When the stress at break and the elongation at break are within the above ranges, it is possible to obtain an energy absorber having more excellent impact energy absorbability and is much less likely to be broken, for example, fractured.

<Tensile Test>
Measuring methods: ISO 527-1 and ISO 527-2
Temperature: 23.0° C.
Test speed; 50±5 mm/min
(test speed at the time of measuring tensile elastic modulus: 1±0.2 mm/min)
Sample shape: Type A multipurpose test specimen specified in ISO 3167 (JIS K7139)

The energy absorber according to the present invention may be a solid molded body or a foamed molded body. Particularly, the energy absorber according to the present invention is preferably a solid molded body from the viewpoint of achieving excellent impact absorbability.

Further, this energy absorber can be manufactured by a method depending on its structure, intended use, etc.

When the energy absorber is a solid molded body, the solid molded body can be manufactured by subjecting a raw material composition to injection molding, extrusion molding (sheet extrusion, profile extrusion), T-die molding, blow molding, injection blow molding, inflation molding, blow molding, vacuum molding, compression molding, press molding, stamping molding, or transfer molding. These molding methods may be used singly or in combination of two or more of them.

Alternatively, when the energy absorber is a foamed molded body, the foamed molded body can be manufactured by chemical foaming or physical foaming of a raw material composition. At this time, a known method can be used, such as injection foam molding, press foam molding, extrusion foam molding, stampable foam molding, or heat foam molding. These molding methods may be used singly or in combination of two or more of them.

The raw material composition to be used may be the olefin-based resin composition or a mixture itself of the olefin resin composition and another constituent material. Alternatively, the raw material composition to be used may be a melt-kneaded product containing the olefin resin, the polyamide resin, and the modified elastomer.

As the melt-kneaded product, a thermoplastic resin composition can be used which contains a melt-kneaded product of the olefin resin, the polyamide resin, and the modified elastomer.

More specifically, a thermoplastic resin composition is preferably used which is obtained by a preparation method including, in order, a first melt-kneading step in which a first raw material containing the polyamide resin and the modified elastomer is melt-kneaded to obtain a first kneaded product and a second melt-kneading step in which a second raw material containing the first kneaded product and the olefin resin is melt-kneaded (i.e., a thermoplastic resin composition containing a melt-kneaded product of a melt-kneaded product of the polyamide resin and the modified elastomer and the olefin resin).

Further, after the second melt-kneading step, the obtained second kneaded product (olefin-based resin composition) may be kneaded with another olefin resin, and the thus obtained kneaded product may be used as the melt-kneaded product.

It is to be noted that the olefin resin, the polyamide resin, and the modified elastomer may be melt-kneaded at the same time.

In either case, melt-kneading can be performed using a melt-kneading apparatus such as an extruder (e.g., a single-screw extruder or a twin-screw kneading extruder), a kneader, or a mixer (e.g., a high-speed flow mixer, a paddle mixer, or a ribbon mixer). These apparatuses may be used singly or in combination of two or more of them. When two or more of the apparatuses are used, they may be operated either continuously or batch-wise. Further, all the raw materials may be mixed at a time or may be mixed by adding them in several batches (multistage addition).

In the first melt-kneading step, melt kneading of the polyamide resin and the modified elastomer may be performed by adding all of them at a time or by adding one of them to the other in several batches. The kneading temperature at this time is preferably 190 to 350° C., more preferably 200 to 330° C., even more preferably 205 to 310° C.

Further, in the second melt-kneading step, melt-kneading of the first kneaded product and the olefin resin may be performed by adding all of them at a time or by adding one of them to the other in several batches. The kneading temperature at this time is preferably 190 to 350° C., more preferably 200 to 300° C., even more preferably 205 to 260° C.

It is to be noted that the first kneaded product and the second kneaded product may be solidified by pelletization or the like or may be in the form of a molten material.

As the olefin resin, an α-olefin homopolymer or copolymer may be directly used. Alternatively, the olefin resin to be used may be, for example, a mixed resin of polypropylene, polyethylene, and ethylene-propylene rubber (non-modified olefin elastomer) known as "block-type polypropylene" because propylene and an ethylene-propylene copolymer are preferred as raw material resins containing the olefin resin.

Further, the modified elastomer is preferably an elastomer having a reactive group, which can react with the polyamide resin, attached thereto, and the above-described one is used. As the modified elastomer used to prepare the raw material composition, an α-olefin copolymer "TAFMER series" (trade name) manufactured by Mitsui Chemicals, Inc., or "AMPLIFY series" (trade name) manufactured by The Dow Chemical Company can be used.

When the total of the olefin resin, the polyamide resin, and the modified elastomer to be used as main components in the above preparation method is taken as 100% by mass, the ratios of the olefin resin, the polyamide resin, and the modified elastomer may be 2 to 90% by mass, 1 to 75% by mass, and 1 to 60% by mass, respectively, and are preferably 5 to 85% by mass, 3 to 70% by mass, and 3 to 55% by mass, more preferably 10 to 83% by mass, 5 to 65% by mass, and 5 to 50% by mass, even more preferably 15 to 80% by mass, 7 to 60% by mass, and 7 to 45% by mass, even more preferably 20 to 78% by mass, 10 to 57% by mass, and 10 to 43% by mass, particularly preferably 25 to 75% by mass, 13 to 55% by mass, and 10 to 40% by mass, more particularly preferably 30 to 73% by mass, 15 to 50% by mass, and 13 to 37% by mass, even more preferably 35 to 70% by mass, 20 to 45% by mass, and 15 to 35% by mass, respectively.

When the mixing ratio of them is within the above range, it is possible to obtain an energy absorber having excellent impact resistance and excellent impact energy absorbability. Particularly, it is possible to obtain an energy absorber having an excellent performance balance among impact resistance, impact energy absorbability, and moldability.

It is to be noted that there is a case where the polyamide resin varies in its performance depending on its type. A preferred amount of the polyamide resin to be used to obtain the effects of the present invention is as follows.

When polyamide 6 is used as the polyamide resin, the amount of the polyamide 6 to be used is preferably 1 to 50% by mass, more preferably 1 to 40% by mass, even more preferably 10 to 35% by mass per 100% by mass of the total of the olefin resin, the polyamide resin, and the modified elastomer.

When polyamide 610 is used as the polyamide resin, the amount of the polyamide 610 to be used is preferably 1 to 40% by mass, more preferably 5 to 40% by mass, even more preferably 10 to 40% by mass per 100% by mass of the total of the olefin resin, the polyamide resin, and the modified elastomer.

When polyamide 11 is used as the polyamide resin, the amount of the polyamide 11 to be used is preferably 1 to 55% by mass, more preferably 10 to 55% by mass, even more preferably 15 to 55% by mass per 100% by mass of the total of the olefin resin, the polyamide resin, and the modified elastomer.

When polyamide 12 is used as the polyamide resin, the amount of the polyamide 12 to be used is preferably 1 to 35% by mass, more preferably 5 to 35% by mass, even more preferably 10 to 35% by mass per 100% by mass of the total of the olefin resin, the polyamide resin, and the modified elastomer.

When polyamide 1010 is used as the polyamide resin, the amount of the polyamide 1010 to be used is preferably 1 to 55% by mass, more preferably 5 to 55% by mass, even more preferably 10 to 55% by mass per 100% by mass of the total of the olefin resin, the polyamide resin, and the modified elastomer.

When polyamide 10T is used as the polyamide resin, the amount of the polyamide 10T to be used is preferably 1 to 45% by mass, more preferably 5 to 45% by mass, even more preferably 10 to 45% by mass per 100% by mass of the total of the olefin resin, the polyamide resin, and the modified elastomer.

When PAMXD6 is used as the polyamide resin, the amount of the PAMXD6 to be used is preferably 1 to 40% by mass, more preferably 5 to 40% by mass, even more preferably 10 to 40% by mass per 100% by mass of the total of the olefin resin, the polyamide resin, and the modified elastomer.

It is to be noted that the form of the energy absorber according to the present invention is not particularly limited, and the energy absorber according to the present invention may take any form depending on its purpose, intended use, etc. Hereinbelow, the energy absorber according to the present invention will be descried with reference to specific embodiments.

Figure 1:
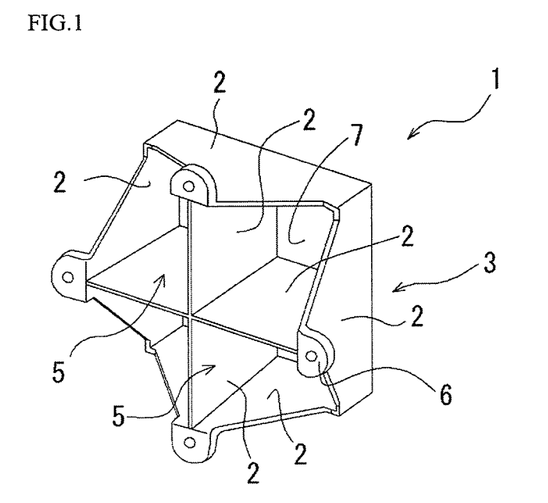
FIG. 1 is a schematic diagram for explaining an energy absorber.
Figure 2:
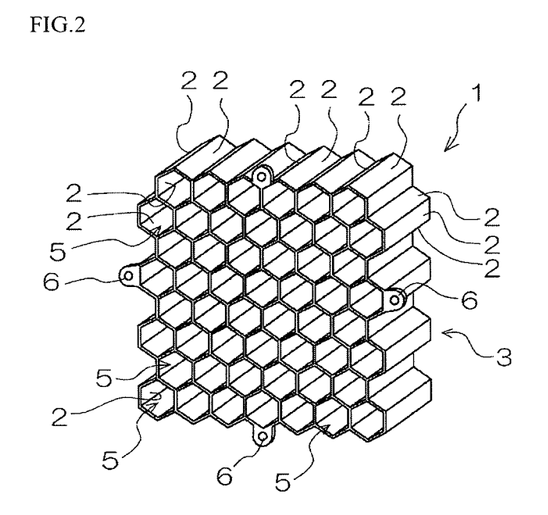
FIG. 2 is a schematic diagram for explaining an energy absorber.

An energy absorber (1) according to an embodiment of the present invention has an impact absorbing frame (3)

having an impact absorbing wall (2) whose plane direction is along a direction in which an impact load is to be applied, wherein the impact absorbing wall (2) is collapsed to absorb an impact when subjected to an impact load (see FIGS. 1 and 2).

The energy absorber according to this embodiment can have further improved impact energy absorbability and is much less likely to be broken, for example, fractured.

The impact absorbing wall (2) is provided so that its plane direction is along a direction in which an impact load is to be applied (i.e., the impact absorbing wall (2) is provided so that its plane direction is substantially parallel to a direction in which an impact load is to be applied), and is therefore collapsed along a direction in which an impact load is applied to absorb impact energy. It is to be noted that the "plane direction" refers to a direction orthogonal to the thickness direction of the impact absorbing wall (2). Further, the "substantially parallel" refers to a concept including not only a case where the plane direction and the direction in which an impact load is to be applied are perfectly parallel but also a case where both of them are slightly inclined so that an angle between them is in the range of ±20° (preferably ±15°, more preferably ±10°).

The thickness of the impact absorbing wall (2) is not particularly limited, and may be appropriately adjusted according to the purpose, intended use, etc. For example, the thickness may be 10 mm or less (particularly 1 to 8 mm, more particularly 2 to 4 mm).

The impact absorbing frame (3) is not particularly limited as long as it has at least the impact absorbing wall (2). Particularly, the impact absorbing frame (3) may have a tubular hollow portion (5) surrounded by the impact absorbing wall (2). When the impact absorbing frame (3) has the hollow portion (5), the energy absorber can have further improved impact energy absorbability and is much less likely to be broken, for example, fractured.

The cross-sectional shape of the hollow portion (5) is not limited only to a quadrangular shape (see FIG. 1), and may be a circular shape, an elliptical shape, or another polygonal shape such as a triangular shape or a hexagonal shape (see FIG. 2).

The number of hollow portions (5) is not particularly limited. Particularly, the impact absorbing frame (3) may have two or more hollow portions (5) (see FIG. 2).

Particularly, the impact absorbing frame (3) having two or more hollow portions (5) may be one having a honeycomb structure (see FIG. 2). When the impact absorbing frame (3) has a honeycomb structure, the energy absorber can have further improved impact energy absorbability and is much less likely to be broken, for example, fractured.

It is to be noted that the "honeycomb structure" refers to a concept including not only a case where the cross-sections of the hollow portions (5) have a regular hexagonal shape but also a case where the cross-sections of the hollow portions (5) have one polygonal shape (see FIG. 1) or two or more polygonal shapes in combination.

Further, the impact absorbing frame (3) may be provided with a mounting portion (6), another wall (7) (see FIGS. 1 and 2), a reinforcing rib, etc.

It is to be noted that the energy absorber (1) may be constituted from only the impact absorbing frame (3) as shown in FIGS. 1 and 2, or may have another constituent member in addition to the impact absorbing frame (3) as in the case of an embodiment that will be described later.

Figure 3:
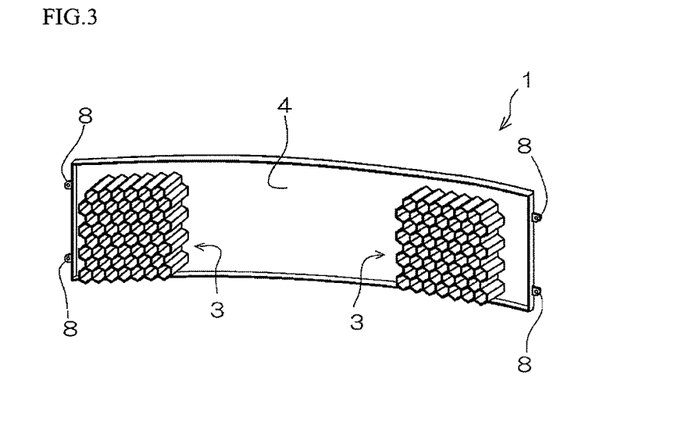
FIG. 3 is a schematic diagram for explaining an energy absorber.

An energy absorber (1) according to another embodiment of the present invention may have, for example, an exterior part (4) and one or more impact absorbing frames (3) provided to be connected to the exterior part (4) (see FIG. 3). It is to be noted that the above description about the impact absorbing frame (3) can be directly applied to this impact absorbing frame (3).

The exterior part (4) is not particularly limited as long as it is provided to be connected to the impact absorbing frame (3), and the shape thereof is appropriately adjusted according to the shape of a part where the energy absorber (1) is to be provided.

Further, the exterior part (4) may be provided with a mounting part (8), a reinforcing rib, etc.

It is to be noted that each of these energy absorbers (1) according to the embodiments of the present invention can be manufactured by integral molding using the above-described raw material composition.

The energy absorber according to the present invention has excellent impact resistance and excellent impact energy absorbability, and is therefore less likely to be broken, for example, fractured. Further, the energy absorber according to the present invention exhibits excellent ductility (extensibility) and repairability (restorability) when subjected to an impact, and therefore unless the energy absorber according to the present invention is broken, its shape is restored. That is, the energy absorber according to the present invention has also excellent durability. Further, even when subjected to an excessive impact, the energy absorber according to the present invention is ductilely fractured, and is therefore highly safe.

For this reason, the energy absorber according to the present invention is suitable for parts for vehicles (for automobiles and bicycles), parts for ships, parts for aircraft, industrial materials, office equipment parts, daily necessities, toys, sporting goods, building material parts, structures, medical supplies, and agriculture-, forestry-, and fishery-related parts. For example, the energy absorber according to the present invention is suitable for exterior parts, interior parts, and base materials thereof for parts for vehicles, parts for ships, and parts for aircraft.

Among the parts for vehicles, examples of automobile-related parts include: exterior parts such as roof rails, fenders, garnishes, bumpers, door panels, roof panels, hood panels, trunk lids, spoilers, and cowls; interior parts such as door trims, pockets, arm rests, decorative panels, ornament panels, energy absorbers (impact absorbers) [specific examples thereof include energy absorbers for automobiles called bumper energy absorbers, pedestrian protection energy absorbers, pedestrian protection systems, pedestrian-protection beams, front-end pedestrian-protection systems, crash cans, fascia supports, corner impact protections, energy absorbers, energy absorber systems, crash boxes, and honeycomb structure energy absorbers], speaker grills, quarter trims, pillar garnishes, cowl side garnishes, shields, back boards, dynamic dampers, side air-bag peripheral parts, instrument panels, air-bag peripheral parts, center consoles, overhead consoles, sunvisors, package trays, high mount stop lamp covers, seat side garnishes, assist grips, and safety belt parts; and electrical parts such as lamp housings, cleaner cases, and filter cases.

Examples of the industrial materials include transport containers, trays, trucks, pylons, center poles, and construction equipment.

Examples of the daily necessities include food trays, helmets, shoes, book-slides, dishes, and cleaning tools.

Examples of the sporting goods include protectors (baseball, soccer, motor sports), outdoor products, and climbing tools.

Examples of the building material parts include heat insulating materials.

Examples of the structures include road signs.

Examples of the medical supplies include mouthpieces, medical devices, and drug containers.

Examples of the agriculture-, forestry-, and fishery-related parts include floats, planters, and culture fishery-related tools.

Among them, the energy absorber according to the present invention is preferably used as an energy absorption material (EA material) in automobile-related parts. Particularly, the energy absorber according to the present invention can be suitably used as an EA material at least part of which is collapsed by an impact load at the time of collision (frontal collision, rear-end collision, broadside collision) to absorb impact energy.

EXAMPLES

Hereinbelow, the present invention will be more specifically described with reference to examples.

[1] Preparation of Molded Bodies for Evaluation

Example 1

A molded body for evaluation of Example 1 was prepared by the following procedure, which was made of an olefin-based resin composition containing 55% by mass of an olefin, 25% by mass of a polyamide resin, and 20% by mass of a modified elastomer per 100% by mass of the total of the olefin-based resin composition (energy absorber).

(1-1) Preparation of First Kneaded Product

Pellets of a polyamide resin [nylon 11 resin, manufactured by Arkema, product name: "Rilsan BMN O", weight-average molecular weight: 18,000, melting point: 190° C.] and pellets of a modified elastomer [maleic anhydride-modified ethylene-butene copolymer (modified EBR), manufacture by Mitsui Chemicals, Inc., product name: "TAFMER MH7020", MFR (230° C.)=1.5 g/10 min] were dry-blended, then fed into a twin-screw melt-kneading extruder (manufactured by Coperion, screw diameter: 50 mm, L/D=48), and melt-kneaded under conditions of a kneading temperature of 210° C., an extrusion speed of 150 kg/hr, and a screw rotation speed of 500 rpm. The thus-obtained kneaded product was pelletized by a pelletizer to obtain pellets of the first kneaded product.

(1-2) Preparation of Molded Body for Evaluation

The pellets of the first kneaded product obtained in the above (1-1) and pellets of an olefin resin [polypropylene resin (homopolymer), manufactured by Japan Polypropylene Corporation, product name: "NOVATEC MA1B", weight-average molecular weight: 312,000, melting point: 165° C.] were dry-blended, then fed into a twin-screw melt-kneading extruder (manufactured by Coperion, screw diameter: 50 mm, L/D=48), and melt-kneaded under conditions of a kneading temperature of 210° C., an extrusion speed of 150 kg/hr, and a screw rotation speed of 500 rpm. Then, the thus-extruded thermoplastic resin composition was cut using a pelletizer to produce pellets of the thermoplastic resin composition of Example 1. Then, the obtained pellets of the thermoplastic resin composition of Example 1 were fed into a hopper of an injection molding machine (manufactured by NISSEI PLASTIC INDUSTRIAL CO., LTD., 40-ton injection molding machine) and subjected to injection molding under injection conditions of a set temperature of 210° C. and a mold temperature of 40° C. to obtain a molded body for evaluation (test specimen for measuring physical properties) to be used for measurements and evaluations that will be described later.

It is to be noted that the phase structure of the olefin-based resin composition constituting the molded body for evaluation of Example 1 was determined in the following manner.

A sample cut out from the molded body for evaluation was embedded in a resin and trimmed and cut in a cross section using an ultramicrotome with a diamond knife and subjected to steam dyeing with a metal oxide. An ultrathin section sample was taken from the obtained cross section after dyeing and observed with a transmission electron microscope (TEM, manufactured by Hitachi High-Technologies Corporation, Model "HT7700") to determine a phase structure.

Figure 4:
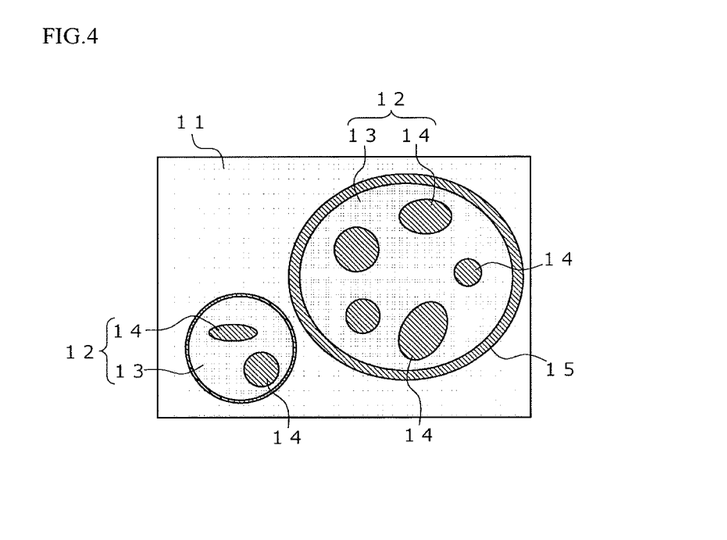
FIG. 4 is a schematic diagram for explaining a phase structure of an olefin-based resin composition constituting a molded body for evaluation of Example 1.

As a result, as shown in the schematic diagram of FIG. 4, a continuous phase 11 containing the olefin resin, a polyamide resin-based dispersed phase 12 dispersed in the continuous phase 11 and containing the polyamide resin and the modified elastomer, a fine dispersed phase 14 contained in the polyamide resin-based dispersed phase 12, containing the modified elastomer, and dispersed in a matrix phase 13 containing the polyamide resin, and an interfacial phase 15 containing the modified elastomer and present between the continuous phase 11 and the polyamide resin-based dispersed phase 12 were observed.

Example 2

Pellets of a thermoplastic resin composition of Example 2 were prepared by the same procedure as in the above-described Example 1, which were made of an olefin-based resin composition containing 30% by mass of an olefin, 60% by mass of a polyamide rein, and 10% by mass of a modified elastomer per 100% by mass of the total of the olefin-based resin composition (energy absorber). Then, the obtained pellets of the thermoplastic resin composition of Example 2 were subjected to injection molding in the same manner as in Example 1 to obtain a molded body for evaluation to be used for measurements and evaluations that will be described later.

It is to be noted that the phase structure of the olefin-based resin composition constituting the molded body for evaluation of Example 2 was determined in the same manner as in the above-described Example 1.

As a result, a co-continuous phase containing the olefin resin and the polyamide, a polyamide resin-based dispersed phase containing the polyamide resin and the modified elastomer and dispersed in the continuous phase composed of the olefin resin, a fine dispersed phase contained in the polyamide resin-based dispersed phase, containing the modified elastomer, and dispersed in a matrix phase containing the polyamide resin, and an interfacial phase containing the modified elastomer and present between the continuous phase composed of the olefin resin and the polyamide resin-based dispersed phase were observed.

Comparative Examples 1 to 4

The following resin pellets were subjected to injection molding in the same manner as in the above-described Example 1 to obtain molded bodies for evaluation (Comparative Examples 1 to 4) to be used for measurements and evaluations that will be described later.

Resin used in Comparative Example 1: PP (Block PP, "J966HP", manufactured by Prime Polymer Co., Ltd.)

Resin used in Comparative Example 2: PC/ABS ("TECHNIACE PAX 1439", manufactured by NIPPON A&L INC.)

Resin used in Comparative Example 3: PC/PBT ("XENOY 1103", manufactured by Sabic)

Resin used in Comparative Example 4: PA/PPE ("Noryl GTX", manufactured by Sabic)

[2] Evaluation of Impact Resistance

The following measurements were performed using the molded bodies for evaluation of Examples 1 and 2 and Comparative Examples 1 to 4, and the results are shown in Table 1.

(2-1) Measurement of Charpy Impact Strength

The measurement of Charpy impact strength was performed in accordance with JIS K7111-1. The results of the measurement are shown in Table 1. It is to be noted that in the measurement of Charpy impact strength, impact strength was measured at a temperature of 23° C. by an edgewise test method using a test specimen having a notch (type A).

(2-2) Measurement of Flexural Modulus

The measurement of flexural modulus was performed in accordance with JIS K7171. The results of the measurement are shown in Table 1. It is to be noted that the measurement of flexural modulus was performed by applying a load at a speed of 2 mm/min from an action point (curvature radius: 5 mm) located in the middle of two supporting points (curvature radius: 5 mm) whose distance (L) was 64 mm while supporting each of the test specimens at the two supporting points.

[3] Evaluation of Impact Absorbability

Figure 5:
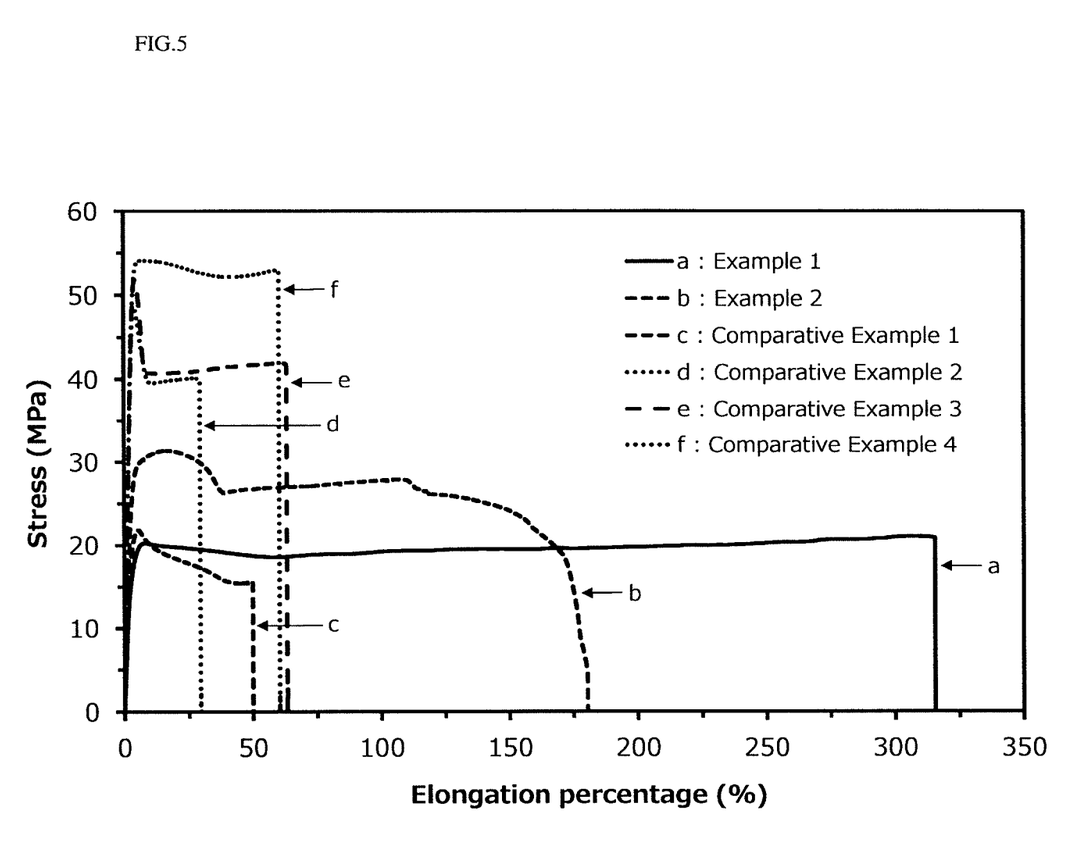
FIG. 5 is a graph showing a correlation between stress and elongation percentage.

A tensile test was performed using each of the molded bodies for evaluation of Examples 1 and 2 and Comparative Examples 1 to 4 under the following conditions, and the correlation between stress and elongation percentage is shown in FIG. 5. Further, stress at break and elongation at break measured at this time are also shown in Table 1.

It is to be noted that the tensile test was performed under the following conditions.

Measuring methods: ISO 527-1 and ISO 527-2
Temperature: 23.0° C.
Test speed: 50±5 mm/min
(test speed at the time of measuring tensile elastic modulus: 1±0.2 mm/min)
Sample shape: Type A multipurpose test specimen specified in ISO 3167 (JIS K7139)

[4] Evaluation of Flowability

The bar-flow length of the resin composition constituting each of the molded bodies for evaluation of Examples 1 and 2 and Comparative Examples 2 to 4 was measured in the following manner, and the results are also shown in Table 1.

Figure 6:
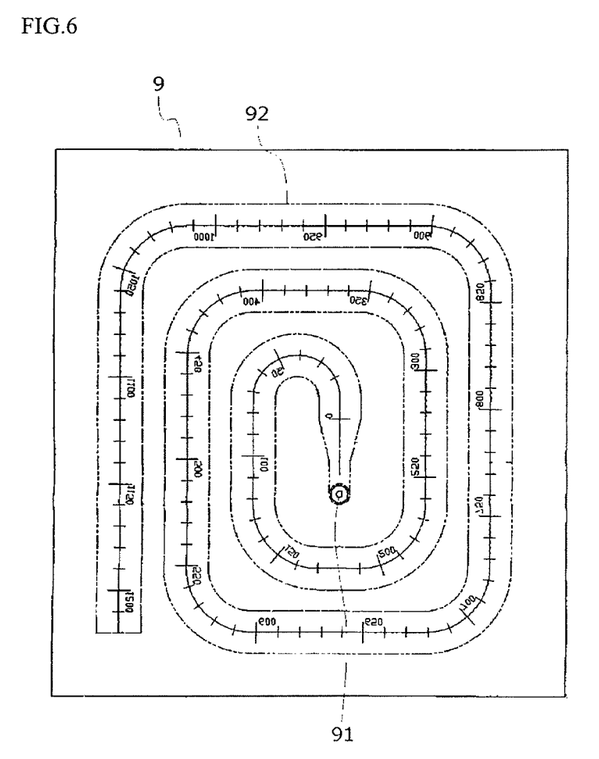
FIG. 6 is a schematic diagram for explaining a bar-flow mold.

A bar-flow mold (a mold 9 shown in FIG. 6 which has an injection port 91 with a diameter of 10 mm and an angular spiral cavity 92 with a width of 20 mm and a thickness of 2 mm) was connected to the extruder used to prepare each of the molded bodies for evaluation, and injection molding was performed under conditions of a cylinder temperature of 190° C., a mold temperature of 60° C., an injection pressure of 150 MPa, an injection speed of 25 to 200 mm/sec (25 mm/sec, 50 mm/sec, 100 mm/sec, 200 mm/sec), and a metering value of 60 (a screw was retracted by 60 mm to provide, in a cylinder, a space of 60 mm for storing a material to be injected), and the length of the thus-obtained molded body was measured as a bar-flow length.

TABLE 1

| | Resin composition | Charpy strength (kJ/m$^2$) | Flexural modulus (MPa) | Stress at break (MPa) | Elongation at break (%) | Resin temp (° C.) | Mold temp (° C.) | Flowability Bar-flow length (mm) at each injection speed | | | |
|---|---|---|---|---|---|---|---|---|---|---|---|
| | | | | | | | | 25 (mm/sec) | 50 (mm/sec) | 100 (mm/sec) | 200 (mm/sec) |
| Example 1 | PP/PA/m-EBR | 72.9 | 775 | 20.5 | 324.8 | 230 | 60 | 534 | 586 | 607 | 620 |
| Example 2 | PP/PA/m-EBR | 90 | 1180 | 32.5 | 180.0 | 230 | 60 | 504 | 565 | 593 | 611 |
| Comparative Example 1 | PP | 17 | 1000 | 21.1 | 49.9 | — | — | — | — | — | — |
| Comparative Example 2 | PC/ABS | 60 | 2050 | 52.2 | 30.0 | 260 | 80 | — | 253 | 263 | — |
| Comparative Example 3 | PC/PBT | 57 | 1960 | 52.5 | 64.0 | 260 | 90 | — | 145 | 151 | — |
| Comparative Example 4 | PA/PPE | 22 | 2300 | 54.8 | 60.4 | 290 | 80 | — | 368 | 381 | — |

[5] Effects

As can be seen from Table 1, the resin compositions of Comparative Examples 1 to 4 had a Charpy impact strength of 17 to 60 kJ/m$^2$ and a flexural modulus of 1000 to 2300 MPa. On the other hand, the resin compositions of Examples 1 and 2 had a Charpy impact strength of 72.9 to 90 kJ/m$^2$ and a flexural modulus of 775 to 1180 MPa. Therefore, it was confirmed that the resin compositions of Examples 1 and 2 have excellent impact resistance.

Further, as can be seen from the results of measurements of stress at break and elongation at break shown in Table 1 and FIG. 5, the resin compositions of Examples 1 and 2 had a lower stress before the start of plastic deformation and a higher elongation percentage before break than the resin compositions of Comparative Examples 1 to 4. Therefore, it was confirmed that when subjected to an impact load, the resin compositions of Examples 1 and 2 exhibit excellent impact absorbability and can reduce a reaction force exerted on an object that applies the impact load.

From the above results, it is considered that an energy absorber having excellent impact resistance and excellent impact energy absorbability can be obtained from each of the resin compositions of Examples. Further, the resin compositions of Examples have high elongation at break, and therefore it is considered that an energy absorber can be obtained which exhibits excellent ductility (extensibility) and repairability (restorability) when subjected to an impact and is less likely to be broken, for example, fractured. It is to be noted that it is considered that even when subjected to an excessive impact, such an energy absorber is ductilely fractured, and therefore a negative influence on its surroundings can be reduced.

Further, as can be seen from Table 1, the resin compositions of Comparative Examples 2 to 4 had a bar-flow length of 145 to 381 mm at an injection speed of 50 to 100 mm/sec.

On the other hand, the resin compositions of Examples 1 and 2 had a bar-flow length of 504 to 620 mm at an injection speed of 25 to 200 mm/sec which was about 1.3 to 4.3 times the results of Comparative Examples 2 to 4.

From the above results, it was confirmed that the resin compositions of Examples 1 and 2 have excellent flowability and excellent formability (moldability). Therefore, it is considered that an energy absorber having a fine shape can be obtained from each of the resin compositions of Examples.

It is to be noted that the present invention is not limited to the specific examples described above, and various changes may be made to the examples within the scope of the present invention depending on the purpose or intended use.

The foregoing examples have been provided merely for the purpose of explanation and are in no way to be construed as limiting of the present invention. Although the present invention has been described with reference to exemplary embodiments, it is understood that the words which have been used in the description and drawings are words of description and illustration, rather than words of limitation. Changes may be made within the scope of the appended claims as described herein without departing from the scope and spirit of the present invention in its aspects. Although the present invention has been described in detail with reference to particular structures, materials, and embodiments, the present invention is not intended to be limited to the particulars disclosed herein; rather, the present invention extends to all functionally-equivalent structures, methods, and uses within the scope of the appended claims.

REFERENCE SIGNS LIST

1: Energy absorber
2: Impact absorbing wall
3: Impact absorbing frame
4: Exterior part
5: Hollow portion
6: Mounting part
7: Another wall
8: Mounting part
9: Bar-flow mold
11: Continuous phase
12: Polyamide resin-based dispersed phase
13: Matrix phase
14: Fine dispersed phase
15: Interfacial phase

The invention claimed is:

1. An energy absorber comprising an olefin-based resin composition,
   wherein the olefin-based resin composition has a continuous phase containing the olefin resin, and a polyamide resin-based dispersed phase dispersed in the continuous phase,
   wherein the polyamide resin-based dispersed phase has a structure in which the elastomer is contained in a matrix phase containing the polyamide resin,
   wherein the energy absorber is obtained by mixing by dry-blending and melt-kneading a polyamide resin and an elastomer to obtain a first kneaded product, and then mixing by dry-blending and melt-kneading the first kneaded product with a polyolefin resin, and
   wherein the polyolefin resin is a block copolymerized resin having an ethylene block as a dispersed phase, and
   wherein at least part of the ethylene block is aggregated at an interface between the continuous phase and the dispersed phase.

2. The energy absorber according to claim 1, wherein when a total of the continuous phase and the polyamide resin-based dispersed phase is taken as 100% by mass, a ratio of the polyamide resin-based dispersed phase is 90% by mass or less.

3. The energy absorber according to claim 1, wherein the elastomer is an α-olefin-based copolymer containing a structural unit derived from an α-olefin having 3 to 8 carbon atoms.

4. The energy absorber according to claim 1, wherein the elastomer has a reactive group that is an acid anhydride group or a carboxyl group.

5. The energy absorber according to claim 1, which has an impact absorbing frame having an impact absorbing wall whose plane direction is along a direction in which an impact load is applied, wherein the impact absorbing wall is collapsed when subjected to the impact load to absorb an impact.

6. The energy absorber according to claim 5, wherein the impact absorbing frame has a tubular hollow portion surrounded by the impact absorbing wall.

7. The energy absorber according to claim 6, wherein the impact absorbing frame has a honeycomb structure having the two or more tubular hollow portions.

8. The energy absorber according to claim 1, which is an energy absorber for vehicles.

* * * * *